(12) United States Patent
Hart

(10) Patent No.: US 7,471,209 B2
(45) Date of Patent: Dec. 30, 2008

(54) RFID WHITEBOARD

(75) Inventor: Matt E. Hart, Lunenburg, MA (US)

(73) Assignee: Intuit Inc., Mountain View, CA (US)

( * ) Notice: Subject to any disclaimer, the term of this patent is extended or adjusted under 35 U.S.C. 154(b) by 68 days.

(21) Appl. No.: 11/347,056

(22) Filed: Feb. 2, 2006

(65) Prior Publication Data

US 2007/0176780 A1    Aug. 2, 2007

(51) Int. Cl.
*G08B 13/14* (2006.01)

(52) U.S. Cl. .............. 340/686.1; 340/691.1; 340/691.6; 340/524; 340/525

(58) Field of Classification Search ................ 340/571, 340/686.1, 691.1, 691.6, 524, 525, 539.1, 340/539.21; 273/237; 463/14; 235/375; 40/335, 107, 110, 442
See application file for complete search history.

(56) References Cited

U.S. PATENT DOCUMENTS 6,752,277 B1 * 6/2004 Sempliner .................. 211/59.3
2006/0175753 A1 * 8/2006 MacIver et al. ............. 273/237

* cited by examiner

*Primary Examiner*—Toan N Pham
(74) *Attorney, Agent, or Firm*—Gunnison, McKay & Hodgson, L.L.P.; Philip J. McKay

(57) ABSTRACT

Systems and methods for using radio frequency identification ("RFID") technology in display boards such as whiteboards, corkboards, and bulletin boards are disclosed. An RFID tag is affixed to each object that is placed on the display board. Each tag uniquely identifies the object to which it is affixed. RFID readers are placed in proximity to the board so that the position and identity of the tagged objects on the board can be determined. RFID readers can quickly convey this information to a computing device. Optionally, receipt of the position and identity information at the computing device can trigger other events such as the output of notifications.

23 Claims, 4 Drawing Sheets

RFID WHITEBOARD

BACKGROUND

This invention relates to systems and methods of using RFID technology to capture information posted on a whiteboard, corkboard, bulletin board, or other display board.

People use whiteboards, corkboards, and bulletin boards to present or display information. For example, these types of boards can be used to plan schedules, plot out workflows, display flowcharts, and for numerous other projects. When a person wants to transfer the information presented on one of these boards to a different medium, there are several options. Often, a person simply copies the contents of the board by hand onto another surface or by typing it into a computer.

Alternatively, several mechanisms have been developed to electronically capture the information from the board. For example, a person can take a photograph of the board. Some whiteboards allow electronic capture of the writing on the whiteboard by recording pen strokes or using touch sensitive surfaces. These techniques could also be used to generate an image, such as a pdf or jpeg file. Then, the images of the whiteboard contents can be scanned, for example using OCR techniques, to interpret text. However, OCR is limited by the resolution of the image. These techniques are also limited in their ability to capture changes that are made to the contents of the board. For example, a person may affix a post-it note to the board, tack a new document to the board, affix a document to the board that at least partially overlaps other information on the board, or rearrange documents. These changes are not automatically and accurately captured by existing electronic capture mechanisms.

SUMMARY

In various embodiments, the present invention provides methods and systems for using radio frequency identification ("RFID") technology in display boards such as whiteboards, corkboards, and bulletin boards. An RFID tag is affixed to each object that is placed on the display board. Each tag uniquely identifies the object to which it is affixed. RFID readers are placed in proximity to the board so that the position and identity of the tagged objects on the board can be determined.

In one embodiment, a display board is divided into cells representing the days of the month, wherein each cell contains an RFID reader embedded into the board. In one example, the objects represent activities to be scheduled that can be placed in or attached to the cells. RFID readers embedded in the board report the identities of the tags in each respective cell. Thus, a computing device communicatively coupled to the RFID readers can determine which activities are scheduled for each day from the location and identity of each object. As additional activities are scheduled or as activities are rescheduled for different day, the RFID readers can quickly convey this information to the computing device which updates the schedule. Optionally, receipt of the scheduling information at the computing device can also trigger other events, such as the output of notifications or email messages.

In another variation, two or more RFID readers determine the location and identity of objects placed on a display board using signal strength triangulation. For example, a display board can be used to visually represent the progression of customer orders in a workflow. The objects in this example represent customer orders that are moved from one column to the next as the customer's order is processed through the workflow. RFID readers placed to provide complete signal coverage of the board, for example at both ends of the workflow display board, can detect the signal strength received from each tag. As the object is moved on the board, the signal strengths received by the RFID readers change. A computing device communicatively coupled to the RFID readers can determine the position of the tagged object, and thus determine the stage of the workflow progression in which the customer's order is located.

In yet another variation, the RFID display board can be used to design and build flowcharts. For example, common flowchart items, such as processes, connectors, and decision points can be represented by tagged objects. A user can map out the flowchart on the RFID display board using these tagged objects. RFID readers detect the location and identity of each tagged object, and a computing device communicatively coupled to the RFID readers interprets the identity and location of these flowchart items as the design of a flowchart. Changes made to the tagged objects on the display board such as adding tagged objects, removing tagged objects, or exchanging tagged objects are automatically propagated to the computing device, and the design of the electronic version of the flowchart is updated accordingly.

The description in the specification is not all inclusive and, in particular, many additional features will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

One skilled in the art will readily recognize from the following discussion that alternative embodiments of the structures and methods illustrated herein may be employed without departing from the principles of the invention as set forth in the claims.

DETAILED DESCRIPTION OF THE EMBODIMENTS

The present invention provides methods and systems for using radio frequency identification ("RFID") technology in display boards such as whiteboards, corkboards, and bulletin boards to electronically record information posted on such display boards. An RFID tag is affixed to each object that is placed on the display board. Each tag uniquely identifies the object to which it is affixed. RFID readers are placed in proximity to the board, for example on the opposite side of the board from tagged items. The RFID readers read the tags, and a computing device coupled to the RFID readers can determine the location and identity of the tagged objects on the board from those readings. As tagged objects are moved around the board, the location corresponding to those objects is tracked by the RFID readers, and the location information recorded for those tagged objects is updated in a software application running on the computing device coupled to the RFID readers. The receipt of information from a tag reading can trigger an event in the software application, such as an output of a notification or any other event designated by the application.

Figure 1A:
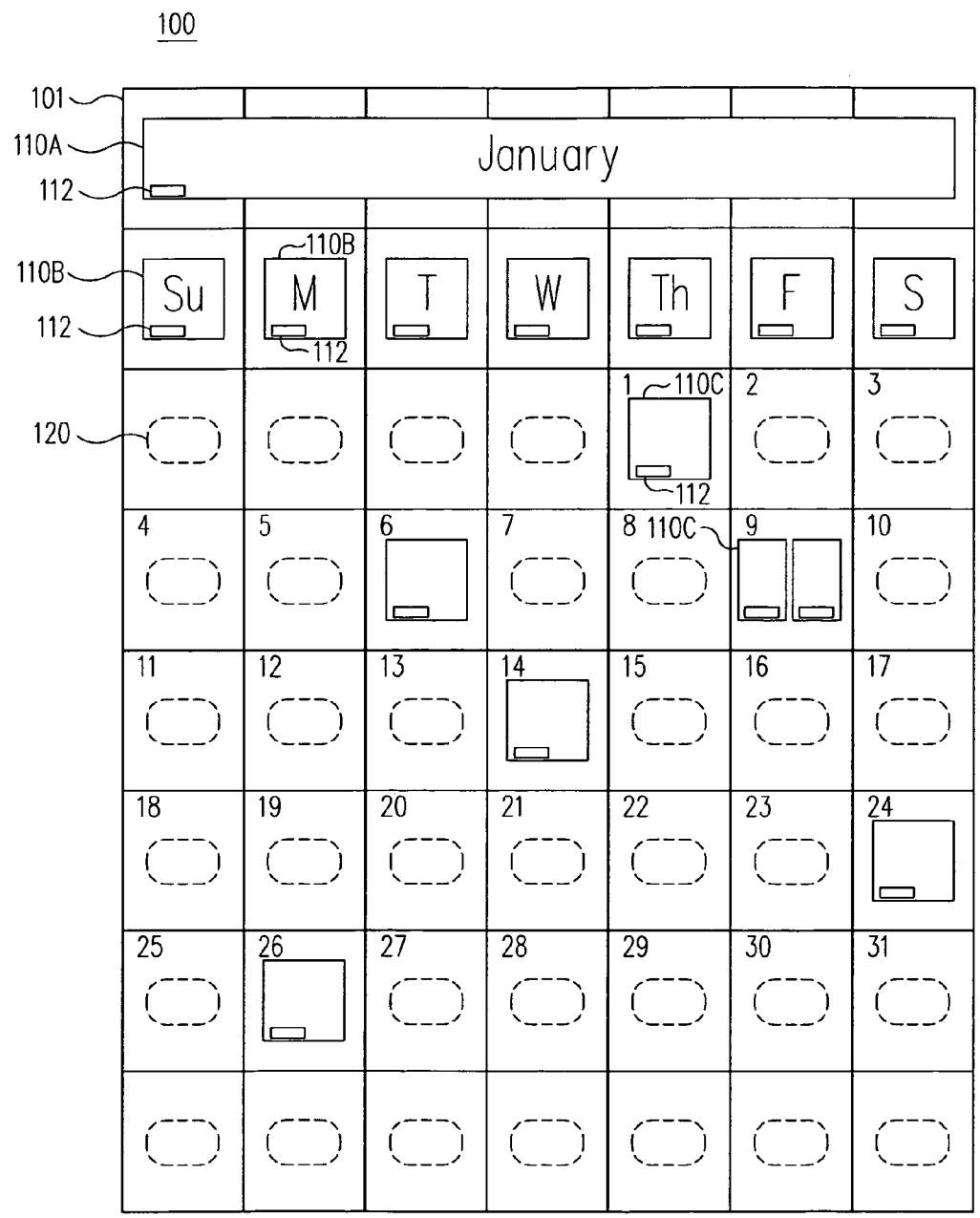
FIGS. 1A and 1B are illustrations of one embodiment of a system for electronically recording information posted on a display board, wherein the display board is an RFID bulletin board used as a scheduling calendar.
Figure 1B:
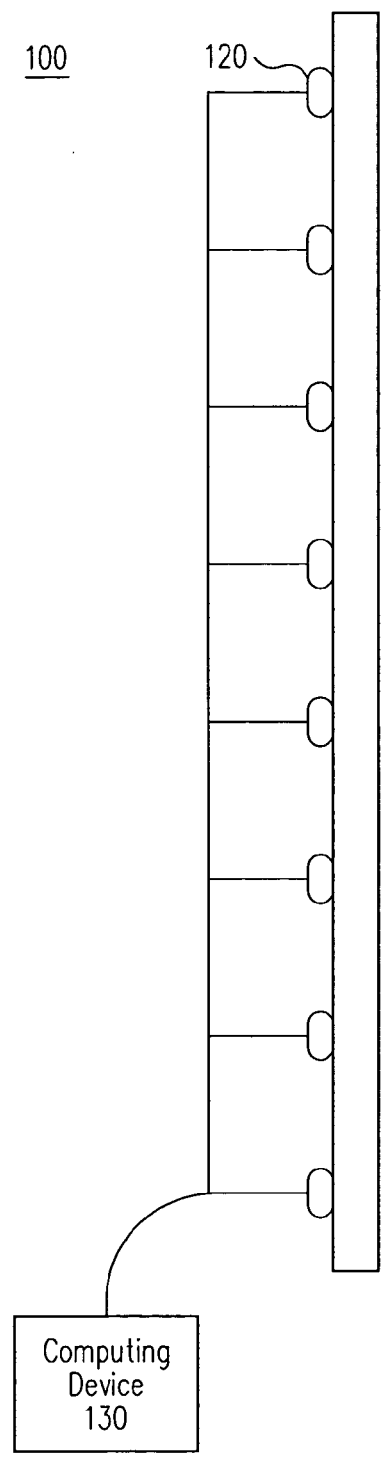

FIGS. 1A and 1B are illustrations of one embodiment of a system 100 for electronically recording information posted on a display board 101, wherein the display board 101 is an RFID bulletin board used as a scheduling calendar. The system 100 includes a display board 101, objects 110A-C placed on the board 101, each object 110A-C having an RFID tag 112 affixed to it, RFID readers 120, and a computing device 130 communicatively coupled to the RFID readers 120.

The display board 101 can be any type of display board such as a whiteboard, a corkboard (such as those used for cubicle construction), a poster board, a foam board, a flexible mat, a blackboard, or a bulletin board, and be constructed of any type of board materials, including but not limited to cardboard, wood, cork, paper, cloth, slate, plastics, metals, or any material, or combination of materials, through which an RFID signal may be detected. In the example illustrated in FIGS. 1A and 1B, the display board 101 is a bulletin board. In FIG. 1A, the days of the month of January have been laid out on the calendar bulletin board. In other embodiments, the display board can be used, for example, for assigning tasks to workers or for other scheduling purposes. The boards of the present invention can be mounted in any orientation. For example, the board may lie flat on a horizontal surface, may be displayed at an angle to a horizontal surface, for example on an inclined plane, or may be mounted on a vertical surface.

Objects 110A-C of various sizes and shapes can be placed on the display board 101. In various embodiments, the objects 110A-C can be paper, wooden or plastic two or three dimensional shapes, but in the example illustrated in FIG. 1A, the objects 110A-C are pieces of paper. The objects 110A-C can be placed on the board 101 using an adhesive, a tack, Velcro, a magnet, or any other manner of temporarily affixing or securing the location of objects 110A-C on the board 101. In another embodiment, objects 110A-C interlock with the surface features of the board 101 such as indentations or bumps on the surface of the display board 101 in order to maintain the position of the object 110A-C after placement while still providing the option of removing the object 110A-C later. In some situations, such as when the board 101 is not meant to be reused, the objects 110A-C can be permanently affixed or secured to a location on the board 101.

Each object 110A-C has an RFID tag 112 affixed to it that uniquely identifies the object 110A-C to which it is attached. In one embodiment, the radio frequency identification tags are passive, whereas in other embodiments, the RFID tags are active. In one embodiment, the RFID tags 112 are embedded in self-adhesive stickers that are attached to the objects 110A-C. In another embodiment, the RFID tags 112 are embedded in the three-dimensional objects 110A-C themselves. The association between the object 110A-C and the RFID tag 112 can be pre-established in a computer program that links each specific RFID tag 112 to information about the object 110A-C to which it is attached. In one embodiment, this association between an object 110A-C and its RFID tag 112 can be changed in the computer program so that the RFID tag 112 can be linked to different information about the object 110A-C or can be reused for a different object 110A-C.

The RFID readers 120 of the system 100 can be directly attached to the front or back surface of the board, or alternatively embedded in the board 101. In the example shown in FIGS. 1A and 1B, the display board 101 has been divided into cells, and each cell contains an RFID reader. In other embodiments, the RFID readers 120 can be part of a docking station for the board 101. The board 101 can be removed from the docking station and worked on, and then replaced at the docking station so that the RFID readers 120 can read the RFID tags on the objects 110A-C when the information should be recorded. In embodiments where the RFID readers 120 are located on the opposite side of the board 101 from the RFID tags 112, as illustrated in FIG. 1B, the board 101 is constructed of a material type and thickness that permits the RFID readers 120 to read tags 112 through the material. In one embodiment, tagged objects that are not currently in use can be stored outside of the range of the RFID readers or inside of container through which RFID signals cannot pass so as to prevent false reads.

The RFID readers 120 are communicatively coupled to the computing device 130. The computing device 130 can be optionally built into the board 101, or located remotely from it. In some embodiments, the communication coupling is a wired connection between the RFID readers 120 and the computing device 130 as shown in FIG. 1B. In other embodiments, this coupling is a wireless connection. The connection allows the information received by the RFID readers 120 regarding which tagged objects are placed on the board 101 to propagate to the computing device 130. The computing device 130 can be, for example, a desktop computer, a laptop computer, a personal digital assistant (PDA), or any computing system capable of processing and storing information.

In some embodiments, a board can be used for more than one purpose. In the example shown in FIG. 1A, board 101 is being used to display a calendar for the month of January. In various embodiments, one or more cells can be used to indicate metadata about the layout of the display board 101, and/or one or more tags may signal the type of layout on which the user is working at that time. For instance, a tag placed in the top left corner may indicate a calendar layout, and in the top right corner a workflow diagram. Alternatively, different tags can be used to signal the layout (e.g., tag X indicates a calendar layout and tag Y indicates a workflow diagram). Further alternatively, the layout can be programmed into the computing device 130.

In the example shown in FIG. 1A, object 110A placed at the top of the display board conveys metadata about the layout of the display board. In this case, the RFID tag 112 attached to the January object 110A being present on the board 101 indicates to the computing device 130 that the layout of the display board is the dates of the month of January. In this example, the default is that a calendar month would be for the current year. In other implementations, the object 110A indicates both the month and the year. Likewise, objects 110B indicate which columns correspond to which days of the week. Users have the option of setting up the calendar so that the week starts on Sunday or Monday, or any other day of the week, by reorganizing the day objects 110B to accommodate their preferences. A software application running on the computing device 130 can determine what cells correspond to what days of the month from the month, year, and the layout of the columns for the days of the week. In some implementations, a user indicates what day the first of the month is by marking it with another object 110. In other implementations, the user can write or otherwise post the dates of the month by hand on the display board.

After the scheduling calendar layout is completed, the user can post appointments by posting objects 110C onto scheduled dates. For example, a company may use the present invention for scheduling service appointments for customers. Each service request is printed on a separate object 110C with a unique RFID tag 112. In one implementation, a software application running on computing device 130 associates the tagged object 110C with the work to be performed, the location of the job, the customer name, and any other pertinent information. A user can post these objects 110C to the display board 101 on the desired dates. In some embodiments, only one object should be placed in each cell. In another embodiment, any number of objects can be placed in each position on the display board. As an example, two objects 110C have been placed on the 9$^{th}$ of January.

When an object 110C is placed in a cell on the board 101, it can optionally trigger events in the application that is receiving serial number and position indicators from the tagged objects 110C. An event can include a notification sent to the worker such as an email, voice mail, page, text message, printed document, or fax containing information about the job, and/or notification sent to a project manager, notification sent to a customer to indicate when the service will be performed, orders for materials sent to a supplier, or any other event designated by the application. If an object 110C is moved to a different date, due to any number of reasons, for example weather or worker or materials availability, then the system 101 can automatically notify customers, suppliers, workers, and managers of the change in the schedule. Other jobs can be automatically changed based on availability as well. For example, some jobs might not be posted on the scheduling RFID display board, including regular maintenance or low-priority work. The expected completion date or other information about those jobs can be automatically changed in response to moving an object 110C. If the information associated with the object 110C is changed in the application, for example, if a different worker is assigned, then notification can be automatically sent to the newly assigned worker.

In one embodiment read-only RFID tags are used. In another variation, read-write RFID tags are used, and some tag readers can act as tag writers. In addition, some tagged objects 110C can include visual status indicators, such as LEDs or LCD readouts that can be activated by an RFID write device. In one implementation, if changing the information associated with the object 110C, such as which worker is assigned to the job, creates a conflict, any conflicting items on the whiteboard could indicate the conflict. For example, scheduled jobs can be on the whiteboard with tags that have an LCD readout and an LED indicator. When a user moves a job to a new day, any conflicting jobs would be automatically programmed by the reader/writer to blink the LED and display a new, nonconflicting day for the job on the LCD readout. Once a user moves the conflicting job to its new day, the reader/writer at that location can reprogram the tag to turn off the LED and clear the LCD readout.

Figure 2:
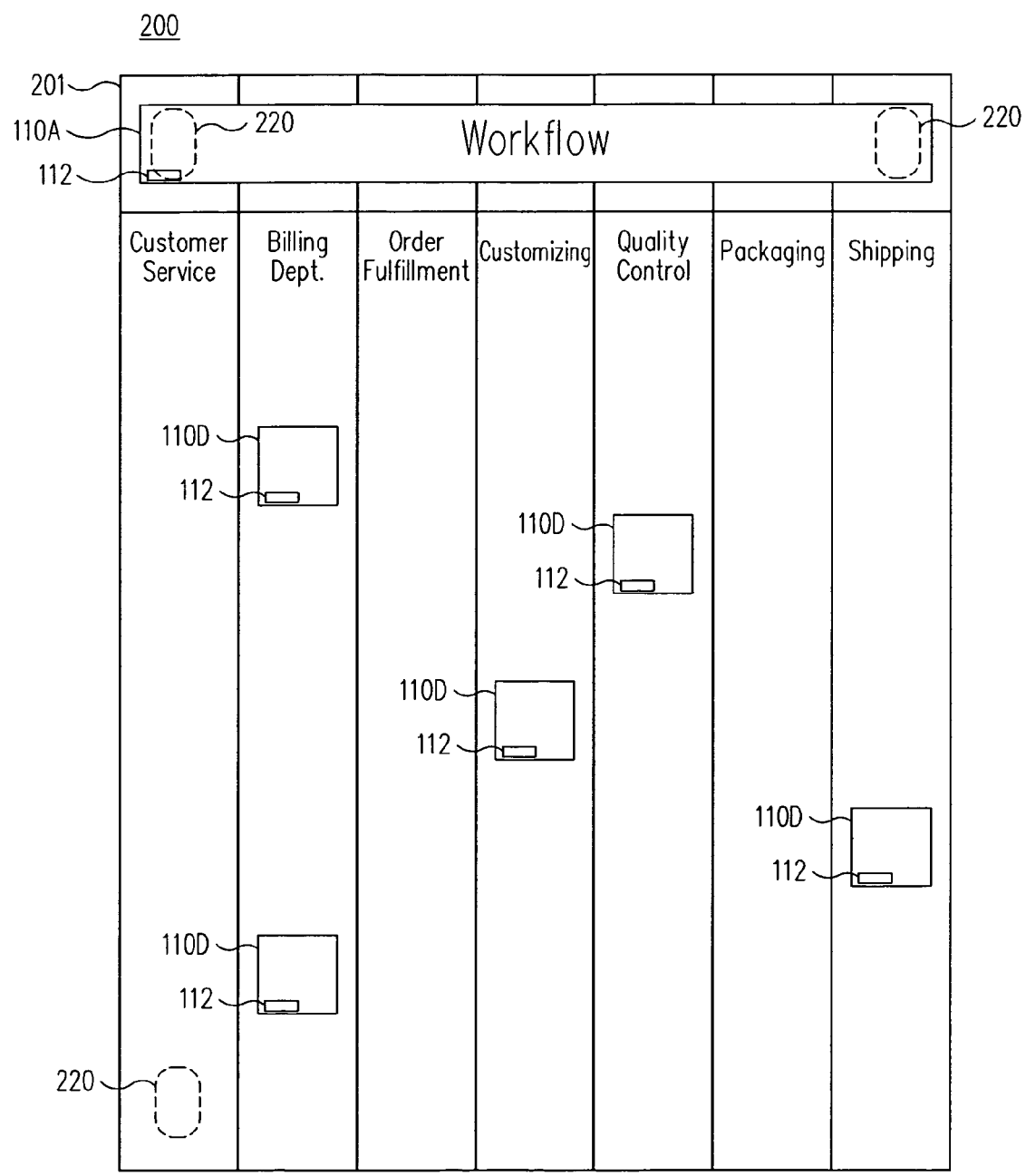
FIG. 2 is an illustration of one embodiment of a system for electronically recording information posted on a display board, wherein the display board is an RFID whiteboard used to display a workflow.

FIG. 2 is an illustration of one embodiment of a system 200 for electronically recording information posted on a display board 201, wherein the display board 201 is an RFID whiteboard used to display a workflow. In the example shown in FIG. 2, object 110A placed at the top of the display board 201 conveys metadata about the layout of the display board 201. In this case, the RFID tag 112 attached to the object 110A being present on the board 201 indicates to the computing device 130 that the layout of the display board 201 is a workflow. The specifics of the workflow may already be contained in the software application running on the computing device 130, or a user may enter or customize them through the software. In this case, the workflow has 7 steps, each step corresponding to a column of the whiteboard 201. A user can optionally add the names of steps of the workflow, in this case Customer Service, Billing Department, Order Fulfillment, Customizing, Quality Control, Packaging, and Shipping, or other pertinent information by writing it by hand using a dry erase marker or otherwise visually designating it on the whiteboard surface as shown in FIG. 2.

In the example shown in FIG. 2, three RFID readers 220 are placed to provide complete signal coverage of the board 201, for example in the upper left, lower left and upper right of the workflow display board 201. The objects 110D in this example represent customer orders that are moved from one column to the next as the customer's order is processed through the workflow. In some embodiments, signal strength triangulation can be used to determine the position of the RFID tags attached to objects. The RFID readers 220 can detect the signal strength received from each tag. As the object is moved on the board, the signal strengths received by the RFID readers 220 change. The computing device 130 communicatively coupled to the RFID readers 220 can determine the position of the tagged object 110D, and thus determine the stage of the workflow progression in which the customer's order is located. As described above with reference to FIGS. 1A and 1B, when an object 110D is placed in a column on the board 101 or moved between columns, it can optionally trigger events in the application that is receiving serial number and position indicators from the tagged objects 110D. An event can include a notification sent to a department manager, a notification sent to a customer, orders for materials sent to a supplier, or any other event designated by the application.

Figure 3:
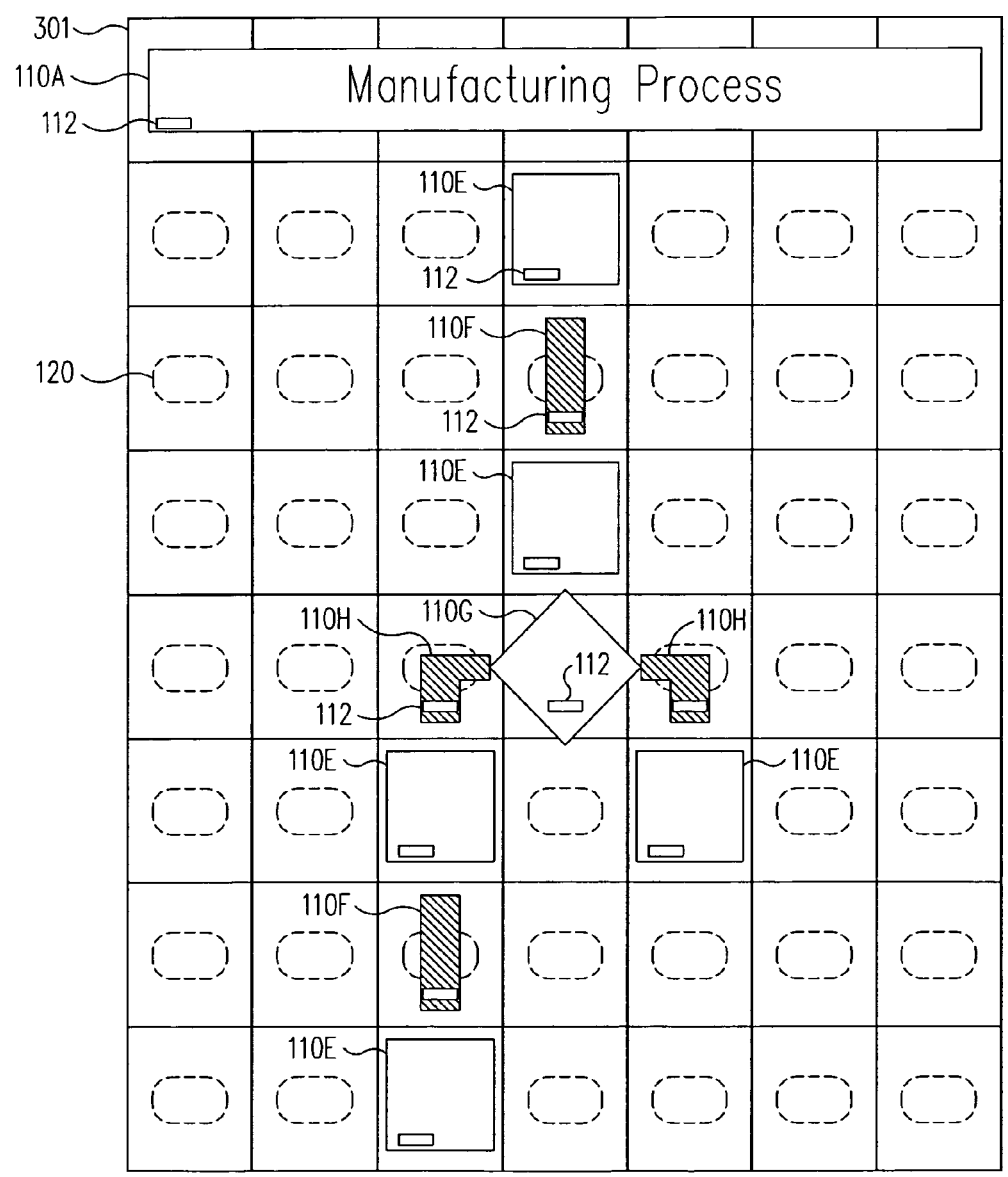
FIG. 3 is an illustration of one embodiment of a system for electronically recording information posted on a display board, wherein the display board is an RFID whiteboard used to design a flowchart.

FIG. 3 is an illustration of one embodiment of a system 300 for electronically recording information posted on a display board 301, wherein the display board 301 is an RFID whiteboard used to design a flowchart. In the example shown in FIG. 3, object 110A placed at the top of the display board 301 conveys metadata about the layout of the display board 301. In this case, the RFID tag 112 attached to the object 110A being present on the board 301 indicates to the computing deice 130 that the layout of the display board 301 is a flowchart design for a Manufacturing Process. Common flowchart items, such as processes, connectors, and decision points can be represented by tagged objects 110E-H. Each individual process can be associated with a respective process object 110E. In this example, processes are connected by connector objects 110F, a decision point is represented by object 110G, and the branches from the decision point are represented by objects 110H. A user can map out the Manufacturing Process flowchart on the RFID whiteboard 301 using these tagged objects. RFID readers 120 detect the location and identity of each tagged object 110A, E-H, and a computing device 130 communicatively coupled to the RFID readers 120 interprets the identity and location of these flowchart items as the design of a flowchart. As described, changes made to the tagged objects 110A, E-H on the display board 301 such as adding tagged objects, removing tagged objects, or exchanging tagged objects are automatically propagated to the computing device 130, and the design of the electronic version of the flowchart is updated accordingly.

In some embodiments, the present invention can work in combination with the electronic capture mechanisms described above in the Background. For example, certain information about the location of the objects placed on the board can be determined through readings of the RFID tags; and other information displayed on the board, such as handwritten notes can be captured using one of the electronic capture mechanisms described.

In all of the foregoing embodiments, the display boards have been described in the context of RFID tags detected by RFID readers. In an alternative embodiment, RFID readers are embedded in the items moved on the board, and the RFID tags are embedded in the display board. In other embodiments, the RFID readers are replaced by ultrasonic receivers, and the RFID tags are replaced by ultrasonic transmitters. In one implementation, the ultrasonic receivers are placed within line-of-sight of the ultrasonic transmitters, for example on the same side of the display board as the objects. In one embodiment, ultrasonic readers can cover an area of about five feet by five feet. Thus, three or more receivers can triangulate the position of the transmitters. Ultrasonic transmitters are read when they are transmitting, and in one implementation, a physical mechanism can be used to activate them. For example, an ultrasonic tag transmission can be turned on and off using a switch. In one embodiment, ultrasonic transmitters on objects transmit until the objects are positioned on the board. The reader can detect it as it is moved and note its last transmitted position. In another embodiment, the ultrasonic transmitters remain on throughout movements on the board. To avoid objects that are moved off of the board as being read as on the board, a neutral position, such as on the edge of the board can be used to indicate an object is being moved off of the board. Users can use pass objects through this area to remove items from the board.

The present invention has been described in particular detail with respect to three possible embodiments. Those of skill in the art will appreciate that the invention may be practiced in other embodiments. Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "identifying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A system for electronically recording information posted on a display board comprising:
    a display board, the display board having a display board first surface, the display board first surface being divided into one or more cells, the one or more cells representing increments of time;
    an object placed at a user defined cell of the one or more cells on the display board first surface of the display board, the user defined cell indicating an increment of time to be associated with the object,
    an RFID tag affixed to the object;
    a first RFID reader for reading the RFID tag affixed to the object; and
    a computing device communicatively coupled to the RFID reader; wherein the computing device determines identity of the object and the cell of the one or more cells on the display board first surface in which the object is placed from the reading of the RFID tag.

2. The system of claim 1, wherein the display board is one selected from a group consisting of a whiteboard, a corkboard, and a bulletin board.

3. The system of claim 1, wherein the display board is comprised of a material through which RFID signals can be transmitted.

4. The system of claim 1, wherein the RFID reader is positioned on a display board second surface, the display board second surface being opposite the display board first surface.

5. The system of claim 1, wherein the RFID reader is embedded in the display board.

6. The system of claim 1, wherein the RFID tag is a read-write tag.

7. The system of claim 1, wherein the object comprises a visual status indicator.

8. The system of claim 1, further comprising:
a second RFID reader for reading the RFID tag; and
a third RFID reader for reading the RFID tag.

9. The system of claim 8, wherein the location of the object on the display board is determined using signal strength triangulation from the readings of the first, second, and third RFID readers.

10. A system for electronically recording information posted on a display board comprising:
a display board, the display board having a display board first surface, the display board first surface being divided into one or more cells, the one or more cells representing a step in a manufacturing process;
an object placed at a user defined cell of the one or more cells on the display board first surface of the display board, the user defined cell indicating a step in the manufacturing process to be associated with the object,
an RFID tag affixed to the object;
a first REID reader for reading the RFID tag affixed to the object; and
a computing device communicatively coupled to the RFID reader; wherein the computing device determines identity of the object and the cell of the one or more cells on the display board first surface in which the object is placed from the reading of the RFID tag.

11. The system of claim 10, wherein the display board is one selected from a group consisting of a whiteboard, a corkboard, and a bulletin board.

12. The system of claim 10, wherein the display board is comprised of a material through which RFID signals can be transmitted.

13. The system of claim 10, wherein the RFID reader is positioned on a display board second surface, the display board second surface being opposite the display board first surface.

14. The system of claim 10, wherein the RFID reader is embedded in the display board.

15. The system of claim 10, wherein the RFID tag is a read-write tag.

16. The system of claim 10, wherein the object comprises a visual status indicator.

17. A system for electronically recording information posted on a display board comprising:
a display board, the display board having a display board first surface, the display board first surface being divided into one or more cells, the one or more cells representing a step in a work flow process;
an object placed at a user defined cell of the one or more cells on the display board first surface of the display board, the user defined cell indicating a step in the workflow process to be associated with the object,
an RFID tag affixed to the object;
a first RFID reader for reading the RFID tag affixed to the object; and
a computing device communicatively coupled to the RFID reader; wherein the computing device determines identity of the object and the cell of the one or more cells on the display board first surface in which the object is placed from the reading of the RFID tag.

18. The system of claim 17, wherein the display board is one selected from a group consisting of a whiteboard, a corkboard, and a bulletin board.

19. The system of claim 17, wherein the display board is comprised of a material through which RFID signals can be transmitted.

20. The system of claim 17, wherein the RFID reader is positioned on a display board second surface, the display board second surface being opposite the display board first surface.

21. The system of claim 17, wherein the RFID reader is embedded in the display board.

22. The system of claim 17, wherein the RFID tag is a read-write tag.

23. The system of claim 17, wherein the object comprises a visual status indicator.

* * * * *

UNITED STATES PATENT AND TRADEMARK OFFICE
CERTIFICATE OF CORRECTION

| | | |
|---|---|---|
| PATENT NO. | : 7,471,209 B2 | Page 1 of 1 |
| APPLICATION NO. | : 11/347056 | |
| DATED | : December 30, 2008 | |
| INVENTOR(S) | : Matt E. Hart | |

It is certified that error appears in the above-identified patent and that said Letters Patent is hereby corrected as shown below:

In Column 9, Line 35, Claim 10, replace "REID" with --RFID--.

Signed and Sealed this

Nineteenth Day of May, 2009

JOHN DOLL
*Acting Director of the United States Patent and Trademark Office*